United States Patent
Cai

(10) Patent No.: US 12,069,194 B2
(45) Date of Patent: Aug. 20, 2024

(54) DISPLAY PANEL AND ELECTRONIC DEVICE

(71) Applicant: WUHAN CHINA STAR OPTOELECTRONICS SEMICONDUCTOR DISPLAY TECHNOLOGY CO., LTD., Wuhan (CN)

(72) Inventor: Fenghao Cai, Wuhan (CN)

(73) Assignee: WUHAN CHINA STAR OPTOELECTRONICS SEMICONDUCTOR DISPLAY TECHNOLOGY CO., LTD., Wuhan (CN)

( * ) Notice: Subject to any disclaimer, the term of this patent is extended or adjusted under 35 U.S.C. 154(b) by 1036 days.

(21) Appl. No.: 16/966,005

(22) PCT Filed: Feb. 19, 2020

(86) PCT No.: PCT/CN2020/075792
§ 371 (c)(1),
(2) Date: Jul. 30, 2020

(87) PCT Pub. No.: WO2021/098065
PCT Pub. Date: May 27, 2021

(65) Prior Publication Data
US 2023/0199094 A1    Jun. 22, 2023

(30) Foreign Application Priority Data
Nov. 21, 2019 (CN) .......................... 201911149890.1

(51) Int. Cl.
*H04M 1/02* (2006.01)

(52) U.S. Cl.
CPC ....... *H04M 1/0264* (2013.01); *H04M 1/0266* (2013.01)

(58) Field of Classification Search
None
See application file for complete search history.

(56) References Cited

U.S. PATENT DOCUMENTS

| 6,850,279 B1 * | 2/2005 | Scherling | G02B 13/0015 |
| | | | 348/E5.025 |
| 7,585,121 B2 * | 9/2009 | Tsai | H04N 23/58 |
| | | | 396/351 |
| 8,836,856 B2 * | 9/2014 | Nomura | G02B 13/009 |
| | | | 348/335 |

(Continued)

FOREIGN PATENT DOCUMENTS

| CN | 104980541 A | 10/2015 |
| CN | 206389421 U | 8/2017 |

(Continued)

*Primary Examiner* — Rodney E Fuller
(74) *Attorney, Agent, or Firm* — PV IP PC; Wei Te Chung; Zhigang Ma

(57) ABSTRACT

A display panel and an electronic device are provided. The electronic device includes a display panel. The display panel includes a display module, a housing, a first sensor, a first plane mirror, and a second plane mirror. Light from a via hole is reflected by the first plane mirror, is incident on the second plane mirror, and enters the camera opening of the first sensor after being reflected by the second plane mirror.

9 Claims, 4 Drawing Sheets

(56) References Cited

U.S. PATENT DOCUMENTS

| | | | | |
|---|---|---|---|---|
| 10,082,649 B2* | 9/2018 | Park | ................ | G03B 17/17 |
| 11,054,621 B2* | 7/2021 | Cho | ................ | G02B 7/04 |
| 11,280,983 B2* | 3/2022 | Ko | ................ | G02B 13/0045 |
| 2001/0027125 A1* | 10/2001 | Kiyomatsu | ......... | H04M 1/0266 |
| | | | | 455/566 |
| 2004/0105025 A1* | 6/2004 | Scherling | ............ | G03B 17/17 |
| | | | | 348/E5.025 |
| 2008/0291543 A1* | 11/2008 | Nomura | ............. | G03B 17/02 |
| | | | | 348/333.01 |
| 2009/0051804 A1* | 2/2009 | Nomura | ............ | H04N 23/667 |
| | | | | 348/344 |
| 2009/0122179 A1* | 5/2009 | Nomura | ............. | H04N 23/57 |
| | | | | 348/340 |
| 2009/0153726 A1* | 6/2009 | Lim | ................ | H04N 23/57 |
| | | | | 348/360 |
| 2010/0328420 A1* | 12/2010 | Roman | ............ | H04N 21/4223 |
| | | | | 348/E7.083 |
| 2012/0075728 A1* | 3/2012 | Takakubo | ......... | G02B 13/0065 |
| | | | | 359/737 |
| 2017/0131526 A1* | 5/2017 | Park | ................. | H04N 23/57 |
| 2019/0056574 A1* | 2/2019 | Cho | ................. | G02B 17/023 |
| 2021/0029231 A1* | 1/2021 | Chen | ............... | H04N 23/51 |

FOREIGN PATENT DOCUMENTS

| | | |
|---|---|---|
| CN | 207652494 U | 7/2018 |
| CN | 208112677 U | 11/2018 |
| CN | 209642733 U | 11/2019 |

* cited by examiner

DISPLAY PANEL AND ELECTRONIC DEVICE

FIELD OF INVENTION

The present disclosure relates to the field of display technologies, and particularly relates to a display panel and an electronic device.

BACKGROUND OF INVENTION

With increasing popularization of mobile portable devices, screens with a high screen-to-body ratio have become a future development trend of electronic equipment such as mobile phones and tablet PCs, as they can provide users better visual experience. Screen-to-body ratio is used to indicate a relative ratio between a screen and an area of a front panel of a mobile phone, and reflects visual experience of users on mobile devices. Therefore, how to realize a narrow bezel to increase the screen-to-body ratio is a difficult problem pending to be solved urgently faced by the industry currently.

With development of display technologies, bezels on four sides of mobile phones are increasingly narrower. However, in order to ensure related functional configurations, such as functions of a front camera or an infrared sensor, etc., a notch design is furtherly made on the bezels of the mobile phones to ensure there is enough place for disposing the front camera. However, there are still certain limitations in the notch design for meeting the largest display place.

As illustrated in FIG. 1 to FIG. 3, a current display panel 90 includes a display screen 91 and a housing sleeved on an exterior of the display screen 91. The housing is constituted by an upper housing 921 and a lower housing 922. The upper housing 921 corresponds to a front surface of the display panel 91, and the lower housing 922 corresponds to a back surface of the display screen 91. The display panel 90 further includes a front camera 93 for photographing on the front surface of the mobile phone and a rear camera 94 for photographing on the back surface of the mobile phone, which are both disposed on the back surface of the display screen 91. The camera of the front camera 93 is toward the front surface of the display screen 91. A first via hole 95 corresponding to the front camera 93 is defined on the upper housing 921. The camera of the rear camera 94 is toward the back surface of the display screen 91. A second via hole 96 corresponding to the camera of the front camera 94 is defined on the lower housing 922. A direction in the figure indicates a direction faced by the front camera 93 and the rear camera 94. The upper housing 921 includes a transparent region 901 for light transmission of the display screen 91 and a light shielding region 902 for shielding light. The light shielding region 902 is disposed to encircle the transparent region 901. The first via hole 95 is defined in the light shielding region 902 and occupies a large space on the front surface of the display screen 91, which causes display ratio to be relatively low.

Therefore, how to reduce occupation of cameras, sensors, etc. on the display area to improve the display ratio of the mobile phone to maximally realize a narrow bezel is a problem pending to be solved urgently in this field.

SUMMARY OF INVENTION

The purpose of the present disclosure is to provide a display panel and an electronic device, which can realize reduction of occupation of sensors on a display area to increase a display ratio to realize a narrow bezel maximally.

In order to solve the problem mentioned above, an embodiment of the present disclosure provides a display panel, which includes a display module, a housing, a first sensor, a first plane mirror, and a second plane mirror.

Specifically, the display module includes a front surface for displaying images and a non-displaying back surface. The housing is sleeved on an exterior of the display module, and a via hole is defined on the housing. The via hole faces the front surface of the display module. The first sensor is disposed on the back surface of the display module, and a camera opening of the first sensor is away from the back surface of the display module. The first plane mirror is disposed in the housing and is disposed under the via hole obliquely. The second plane mirror is disposed in the housing and is disposed under the camera opening of the first sensor obliquely, and the second plane mirror and the first plane mirror face each other to form an included angle. Light from the via hole is reflected by the first plane mirror, is incident on the second plane mirror, and enters the camera opening of the first sensor after being reflected by the second plane mirror.

Furthermore, the display panel includes a second sensor. The second sensor is disposed of the back surface of the display module, and the second sensor is in juxtaposition with the first sensor.

Furthermore, the housing includes an upper housing and a lower housing. Specifically, the upper housing is disposed opposite to the front surface, and the via hole is defined on the upper housing. The lower housing is disposed opposite to the back surface. The first plane mirror and the second plane mirror are disposed on the lower housing.

Furthermore, the upper housing includes a transparent region and a light shielding region. Specifically, the transparent region is used to pass through light emitted from the display module, and the light shielding region is disposed to encircle the transparent region and is used to shield an edge of the display module.

Furthermore, the transparent region is one of a circular shape, a triangular shape, a rectangular shape, or a polygonal shape.

Furthermore, the lower housing further includes a light transmissive hole, and the light transmissive hole is defined opposite to the camera opening of the second sensor.

Furthermore, the first sensor and the second sensor include one or a combination of a camera sensor, a flashlight, a light sensor, a breathing light sensor, a distance sensor, a fingerprint scanning sensor, a microphone sensor, and a transparent antenna sensor.

Furthermore, a cross section of the via hole is less than or equal to a cross section of the camera opening of the first sensor.

Furthermore, the first plane mirror is inclined at 45 degrees relative to the via hole, the second plane mirror is inclined at 45 degrees relative to the camera opening of the first sensor, and the included angle between the first plane mirror and the second plane mirror is 90 degrees.

Another embodiment of the present disclosure provides an electronic device, which includes the display panel mentioned above.

The advantage of the present disclosure is to provide a display panel and an electronic device, which can reduce occupation of sensors on a display area to increase a display ratio to realize a narrow bezel maximally.

DETAILED DESCRIPTION OF PREFERRED EMBODIMENTS

Figure 1:
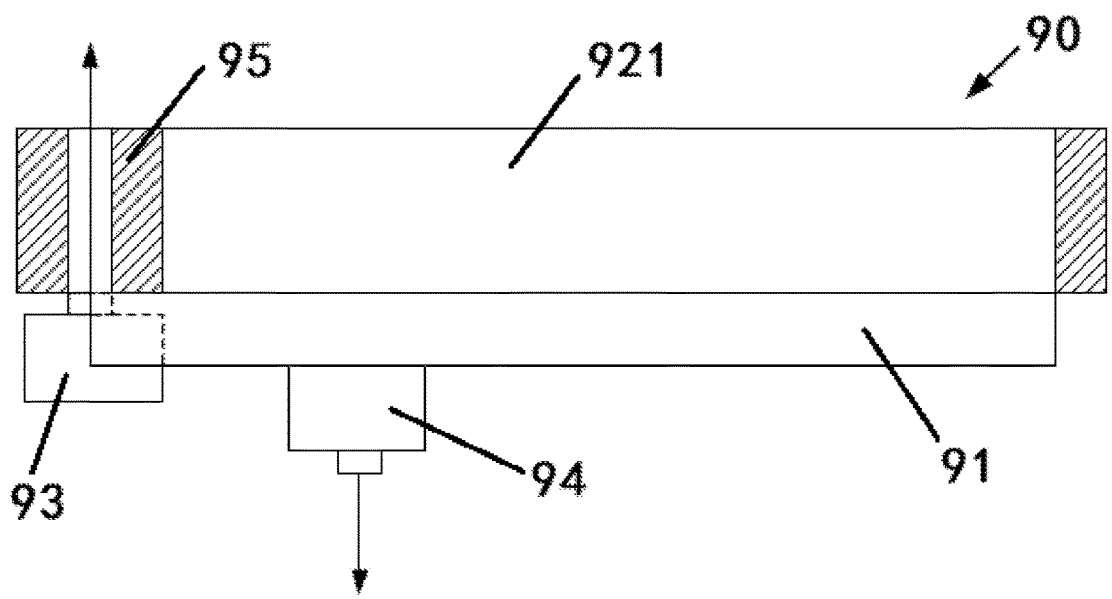
FIG. 1 is a structural schematic diagram of a display screen of a current display panel.
Figure 2:
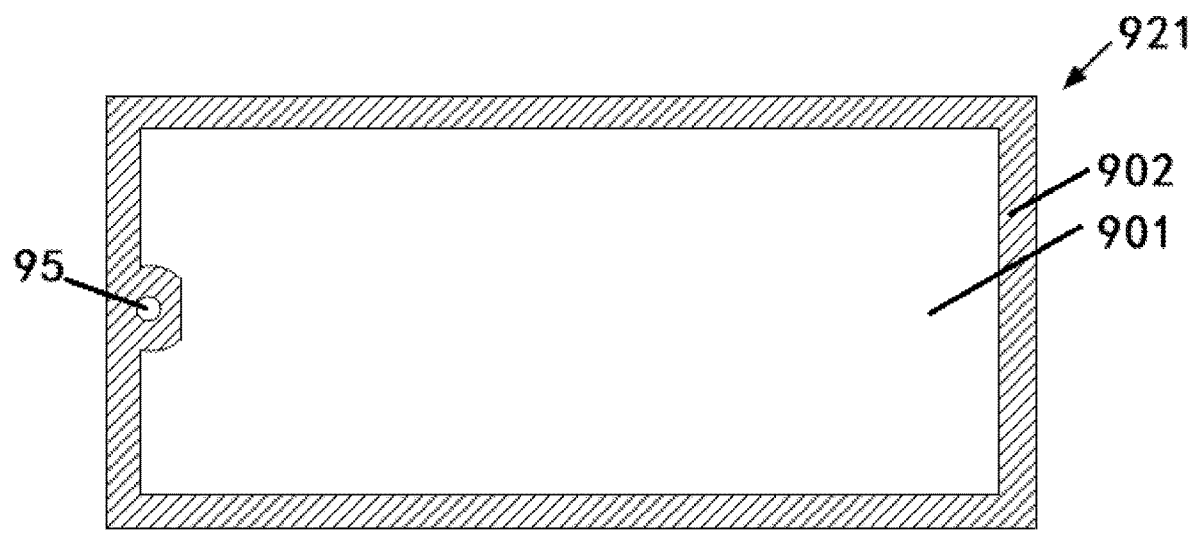
FIG. 2 is a structural schematic diagram of an upper housing of the current display panel.
Figure 3:
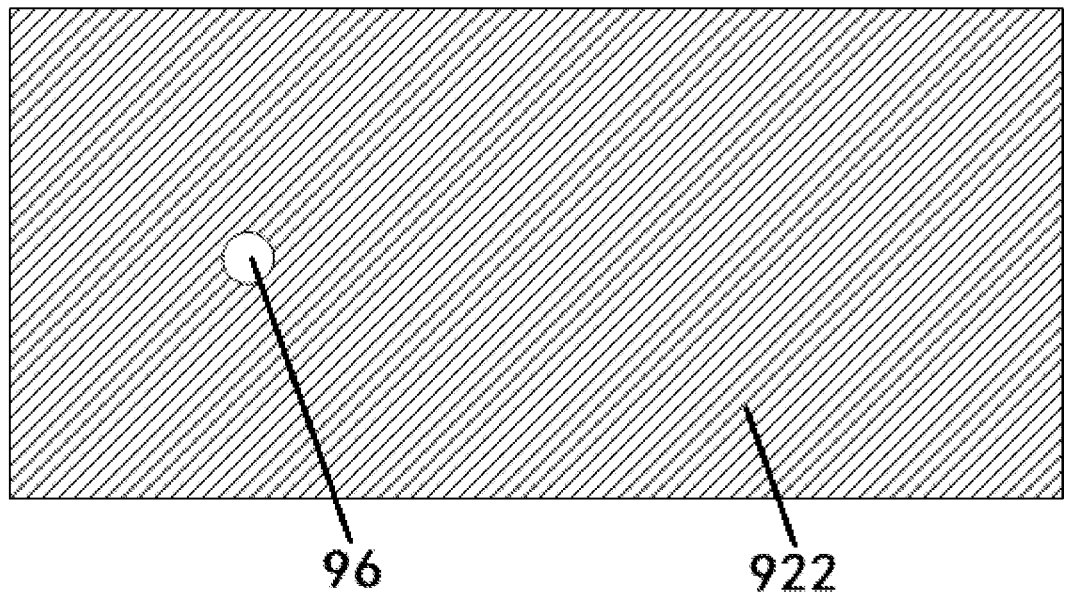
FIG. 3 is a structural schematic diagram of a lower housing of the current display panel.

In the present disclosure, unless expressly specified or limited otherwise, a first feature is "on" or "beneath" a second feature may include that the first feature directly contacts the second feature and may also include that the first feature does not directly contact the second feature. Furthermore, a first feature "on," "above," or "on top of" a second feature may include an embodiment in which the first feature is right "on," "above," or "on top of" the second feature and may also include that the first feature is not right "on," "above," or "on top of" the second feature, or just means that the first feature has a sea level elevation higher than the sea level elevation of the second feature. While first feature "beneath," "below," or "on bottom of" a second feature may include that the first feature is "beneath," "below," or "on bottom of" the second feature and may also include that the first feature is not right "beneath," "below," or "on bottom of" the second feature, or just means that the first feature has a sea level elevation lower than the sea level elevation of the second feature.

In the present disclosure, the same or corresponding components are used the same labels of the accompanying figures to indicate and are unrelated to the figure numbers, and through the specification, when "first", "second" and the like can be used to indicate various components, these components are not limited to above terms. The terms mentioned above is only for distinguishing one component to another component.

An embodiment of the present disclosure provides a display panel, which includes a display module, a housing, at least one first sensor, a first plane mirror, and a second plane mirror.

Specifically, the display module includes a front surface for displaying images and a non-displaying back surface. The housing is sleeved on an exterior of the display module, and a via hole is defined on the housing. The via hole faces the front surface of the display module. The first sensor is disposed on the back surface of the display module, and a camera opening of the first sensor is away from the back surface of the display module. The first plane mirror is disposed in the housing and is disposed under the via hole obliquely. The second plane mirror is disposed in the housing and is disposed under the camera opening of the first sensor obliquely. The second plane mirror and the first plane mirror face each other to form an included angle. Light from the via hole is reflected by the first plane mirror, is incident on the second plane mirror, and enters the camera opening of the first sensor after being reflected by the second plane mirror.

Preferably, the display panel includes a second sensor. The second sensor is disposed of the back surface of the display module, and the second sensor is in juxtaposition with the first sensor.

Preferably, the housing includes an upper housing and a lower housing. Specifically, the upper housing is disposed opposite to the front surface, and the via hole is defined on the upper housing. The lower housing is disposed opposite to the back surface. The first plane mirror and the second plane mirror are disposed on the lower housing.

Preferably, the upper housing includes a transparent region and a light shielding region. Specifically, the transparent region is used to pass through the light emitted from the display module, and the light shielding region is disposed to encircle the transparent region and is used to shield an edge of the display module.

Preferably, the transparent region is one of a circular shape, a triangular shape, a rectangular shape, or a polygonal shape.

Preferably, the lower housing further includes a light transmissive hole, and the light transmissive hole is defined opposite to a camera opening of the second sensor.

Preferably, the first sensor and the second sensor include one or a combination of a camera sensor, a flashlight, a light sensor, a breathing light sensor, a distance sensor, a fingerprint scanning sensor, a microphone sensor, and a transparent antenna sensor.

Preferably, a cross section of the via hole is less than or equal to a cross section of the camera opening of the first sensor.

Preferably, the first plane mirror is inclined at 45 degrees relative to the via hole, the second plane mirror is inclined at 45 degrees relative to the camera opening of the first sensor, and the included angle between the first plane mirror and the second plane mirror is 90 degrees.

Another embodiment of the present disclosure provides an electronic device, which includes the display panel mentioned above.

More detailed embodiments are described as follows.

Figure 4:
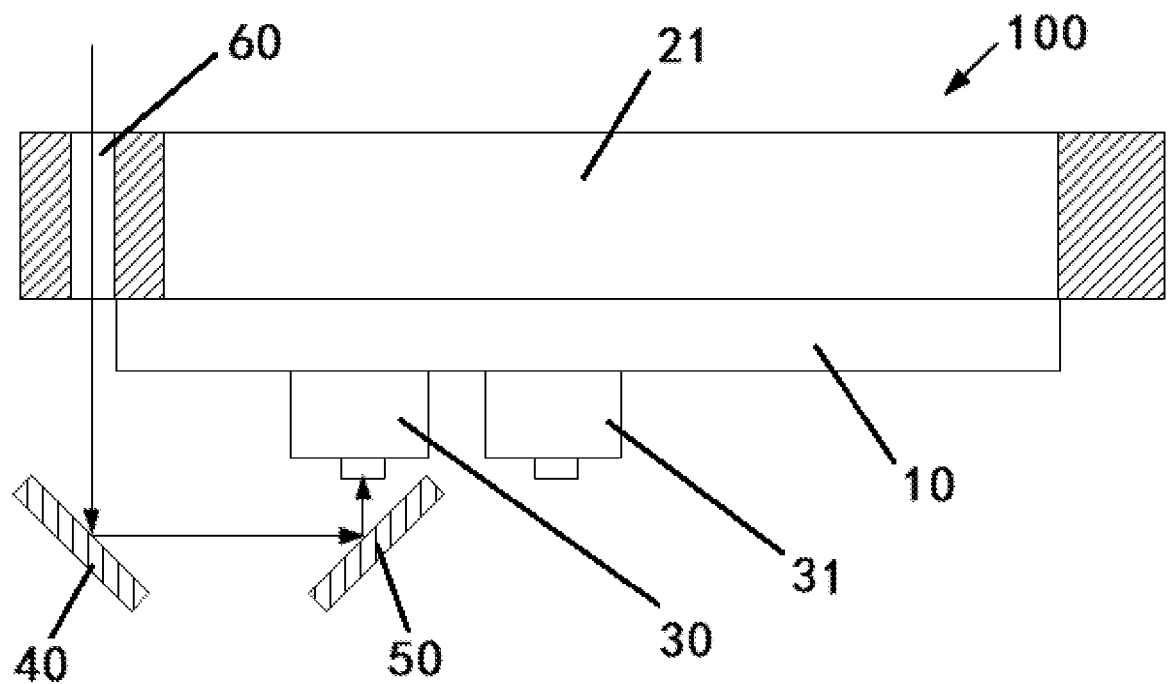
FIG. 4 is a structural schematic diagram of a display module and an upper housing of a display panel of an embodiment of the present disclosure.
Figure 5:
FIG. 5 is a structural schematic diagram of the upper housing of the display panel of an embodiment of the present disclosure.
Figure 6:
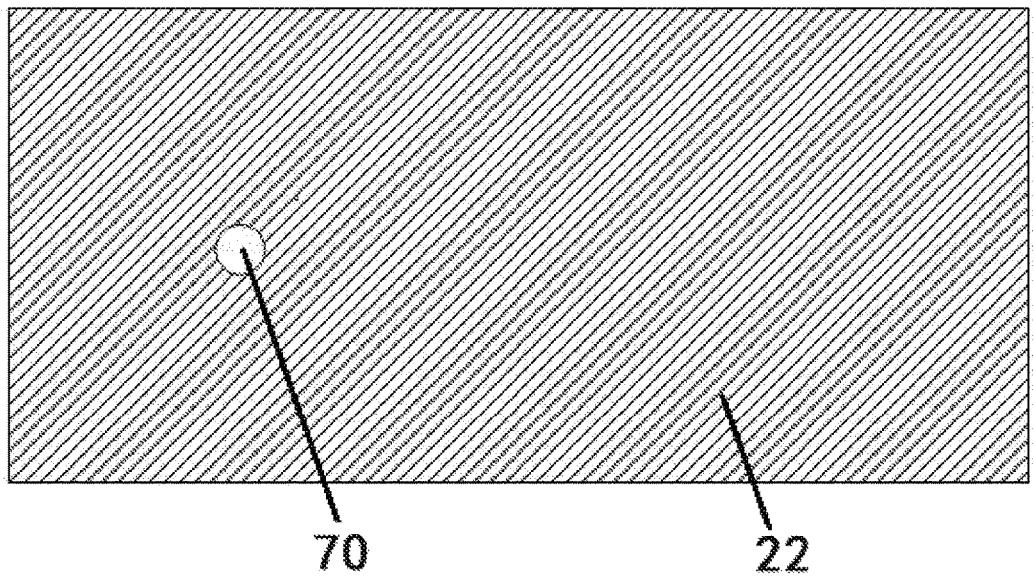
FIG. 6 is a structural schematic diagram of a lower housing of the display panel of an embodiment of the present disclosure.

Please refer to FIG. 4 to FIG. 6. In an embodiment of the present disclosure, a display panel 100 is provided, which includes a display module 10, a housing 20, a first sensor 30, a first plane mirror 40, and a second plane mirror 50. Specifically, the display module 10 includes a front surface for displaying images and a non-displaying back surface. The housing 20 is sleeved on an exterior of the display module 10 to protect the display module 10, and the housing 20 is provided with a via hole 60 located on a side of the front surface. The via hole 60 faces the front surface of the display module 10. The first sensor 30 is disposed on the back surface of the display module 10, and a camera opening of the first sensor 30 is away from the back surface of the display module 10. The first plane mirror 40 is disposed in the housing 20 and is disposed under the via hole 60 obliquely. The second plane mirror 50 is disposed in the housing 20 and is disposed under the camera opening of the first sensor 30 obliquely. The second plane mirror 50 and the first plane mirror 40 face to each other to form an included angle. Light from the via hole 60 is reflected by the first plane mirror 40, is incident on the second plane mirror 50, and enters the camera opening of the first sensor 30 after being reflected by the second plane mirror 50.

In this embodiment, the first plane mirror 40 is inclined at 45 degrees relative to the via hole 60, the second plane mirror 50 is inclined at 45 degrees relative to the camera opening of the first sensor 30, and the included angle formed from the first plane mirror 40 and the second plane mirror 50 is 90 degrees. That is, the first plane mirror 40 is perpendicular to the second plane mirror 50.

In more detail, when in use, light from exterior enters the display panel 100 perpendicularly through the via hole 60. The light is incident on the first plane mirror 40 at a first angle of inclination, for example, 45 degrees, and is reflected by the first plane mirror 40. The reflected light is incident on the second plane mirror 50 at a second angle of inclination, for example, 45 degrees. The light is reflected and reflected again by the second plane mirror 50. At this time, the reflected light can enter the camera opening of the first sensor 30 perpendicularly, so the external light reaching the first sensor 30 is realized. For the propagation route of the light, please see a direction of an arrow illustrated in FIG. 4. The principle thereof is common knowledge and is similar to a configuration manner of an observation opening of a submarine, and redundant description will not be mentioned herein.

In this embodiment, angle ranges of the first angle of inclination and the second angle of inclination range from 0 degree to 90 degrees, that is, greater than 0 degree, and less than 90 degrees. Preferably, angles of the first angle of inclination and the second angle of inclination are 45 degrees. Selecting 45 degrees is conducive to disposing the first plane mirror 40 and the second plane mirror 50. Selecting other degrees is conducive to adapting to appearances of various standards, which can provide good effects of saving and utilizing space.

In this embodiment, the display panel 100 further includes a second sensor 31. The second sensor 31 is disposed on the back surface of the display module 10, and the second sensor 31 is in juxtaposition with the first sensor 30.

In this embodiment, a cross section of the via hole 60 is less than or equal to a cross section of the camera opening of the first sensor 30. This configuration is conducive to reducing the cross section of the via hole 60, thereby being conducive to a narrow bezel design.

Figure 7:
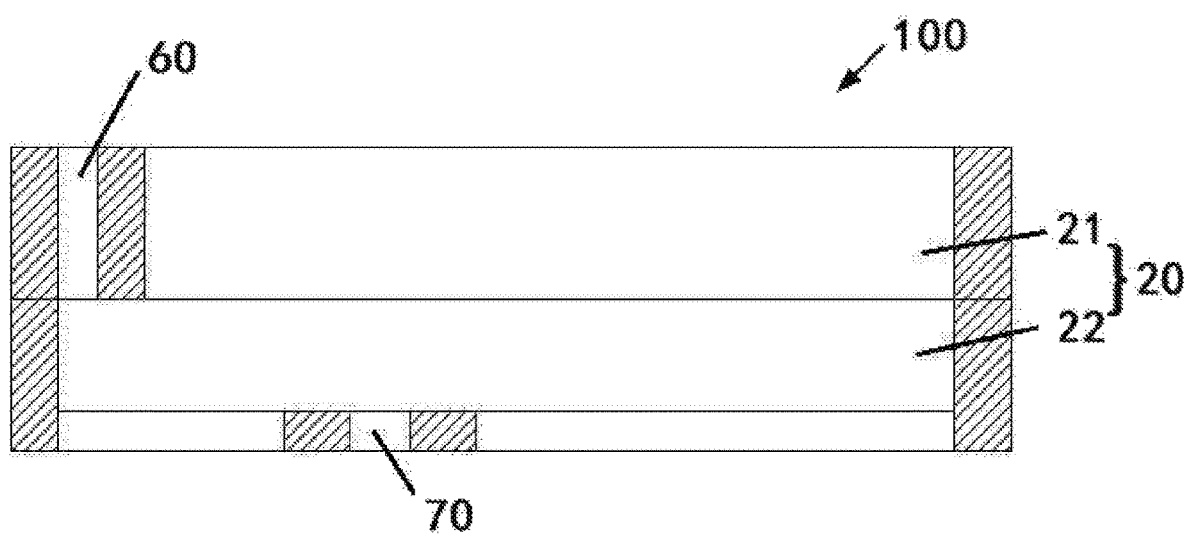
FIG. 7 is a schematic diagram of an assembled structure of the upper housing and the lower housing of the display panel of an embodiment of the present disclosure.

Please refer to FIG. 5 to FIG. 7, in this embodiment, the housing 20 includes an upper housing 21 and a lower housing 22. Specifically, the upper housing 21 is disposed opposite to the front surface, and the via hole 60 is defined on the upper housing 21. The lower housing 22 is disposed opposite to the back surface. The first plane mirror 40 and the second plane mirror 50 are disposed on the lower housing 22. Disposing elements with non-displaying functions on the lower housing 22 is conducive to reducing occupation of the display area and increases the display ratio.

In this embodiment, the upper housing 21 includes a transparent region 211 and a light shielding region 212. Specifically, the transparent region 211 is used to pass through the light emitted from the display module 10. The light shielding region 212 is disposed to encircle the transparent region 211 and is used to shield an edge of the display module 10. Preferably, the via hole 60 is defined in the light shielding region 212.

In this embodiment, the transparent region 211 is one of a circular shape, a triangular shape, a rectangular shape, or a polygonal shape.

In this embodiment, the lower housing 22 further includes a light transmissive hole 70, and the light transmissive hole 70 is defined opposite to the camera opening of the second sensor 31. This configuration can realize the use on both sides of the upper housing 21 and the lower housing 22, which is convenient and flexible.

In this embodiment, the first sensor 30 and the second sensor 31 include one or a combination of a camera sensor, a flashlight, a light sensor, a breathing light sensor, a distance sensor, and a fingerprint scanning sensor.

In an embodiment, the first sensor 30 and the second sensor 31 are preferably camera sensors. At this time, the first sensor 30 is equivalent to a front camera for selfies. That is, assisted by the first plane mirror 40, the second plane mirror 50, and the via hole 60, the first sensor 30 realizes light propagation to capture images located on the front surface of the display module 10. This can effectively reduce occupation of the display area, thereby increasing the display ratio and maximally realizing a narrow bezel. The second sensor 31 is equivalent to a rear camera, which is used to capture photos. That is, the second sensor 31 realizes light propagation by the light transmissive hole 70 to capture images located on the back surface of the display module 10. The display module 10 is used to display the captured-image information from the first 30 and the second sensor 31.

Based on the same inventive concept, an embodiment of the present disclosure provides an electronic device, which includes the display panel 100 mentioned above.

In this embodiment, the electronic device can be any product or part having display functions and sensing functions, such as a mobile phone, a tablet PC, a television, a display device, a laptop, a digital photo frame, a global positioning system, etc.

The working principle of the electronic device provided by this embodiment is same as the working principle of the embodiments of the display panel 100 mentioned above. For the specific structural relationship and the working principle, please refer to the embodiments of the display panel 100 mentioned above, and redundant description will not be mentioned herein again.

The advantage of the present disclosure is to provide a display panel and an electronic device, which can reduce occupation of sensors on a display area to increase a display ratio to realize a narrow bezel maximally.

Mentioned above are preferred embodiments of the present disclosure. It should be noted that those skilled in the art, without departing from the technical theory of the present disclosure, can further make many changes and modifications, and the changes and the modifications should be considered within the scope of protection of the present disclosure.

What is claimed is:

1. A display panel, comprising:
   a display module comprising a front surface for displaying images and a non-displaying back surface;
   a housing sleeved on an exterior of the display module, wherein a via hole is defined through the housing, and the via hole faces the front surface of the display module;
   a first sensor disposed on the back surface of the display module and configured to receive front surface incident light entering from the front surface of the display module, wherein a camera opening of the first sensor is away from the back surface of the display module;
   a first plane mirror disposed in the housing, disposed under the via hole obliquely, and configured to reflect the front surface incident light; and
   a second plane mirror disposed in the housing, disposed under the camera opening of the first sensor obliquely, configured to reflect the front surface incident light, facing the first plane mirror, and forming an included angle, wherein the front surface incident light from the via hole is reflected by the first plane mirror, is incident on the second plane mirror, and enters the camera opening of the first sensor after being reflected by the second plane mirror;

wherein the housing comprises:
- an upper housing disposed opposite to the front surface, wherein the via hole is defined on the upper housing; and
- a lower housing disposed opposite to the back surface, wherein the first plane mirror and the second plane mirror are disposed on the lower housing;

wherein an outer edge of the upper housing is flush with an outer edge of the lower housing.

2. The display panel as claimed in claim 1, wherein the display panel comprises a second sensor, the second sensor is disposed of the back surface of the display module, and the second sensor is in juxtaposition with the first sensor.

3. The display panel as claimed in claim 2, wherein the first sensor and the second sensor comprise one or a combination of a camera sensor, a flashlight, a light sensor, a breathing light sensor, a distance sensor, a fingerprint scanning sensor, a microphone sensor, and a transparent antenna sensor.

4. The display panel as claimed in claim 1, wherein the upper housing comprises:
- a transparent region used to pass through light emitted from the display module; and
- a light shielding region disposed to encircle the transparent region and used to shield an edge of the display module.

5. The display panel as claimed in claim 4, wherein the transparent region is one of a circular shape, a triangular shape, a rectangular shape, or a polygonal shape.

6. The display panel as claimed in claim 1, wherein the lower housing comprises a light transmissive hole, and the light transmissive hole is defined opposite to a camera opening of the second sensor.

7. The display panel as claimed in claim 1, wherein a cross section of the via hole is less than or equal to a cross section of the camera opening of the first sensor.

8. The display panel as claimed in claim 1, wherein the first plane mirror is inclined at 45 degrees relative to the via hole, the second plane mirror is inclined at 45 degrees relative to the camera opening of the first sensor, and the included angle between the first plane mirror and the second plane mirror is 90 degrees.

9. An electronic device, comprising the display panel as claimed in claim 1.

* * * * *